H. C. PIERCE.
REFRIGERATOR.
APPLICATION FILED MAR. 27, 1920.
1,396,875.
Patented Nov. 15, 1921.
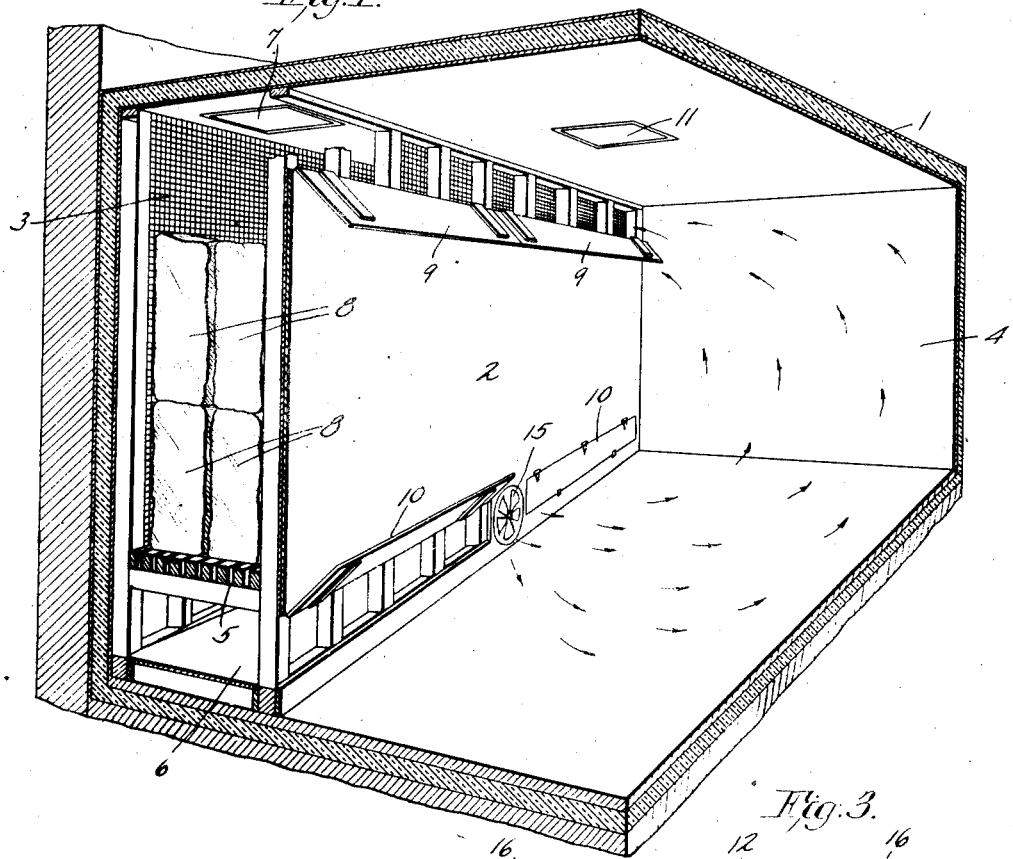
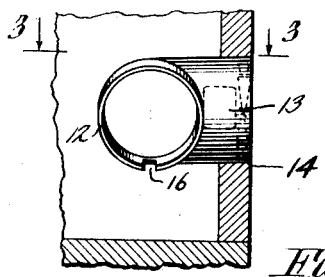
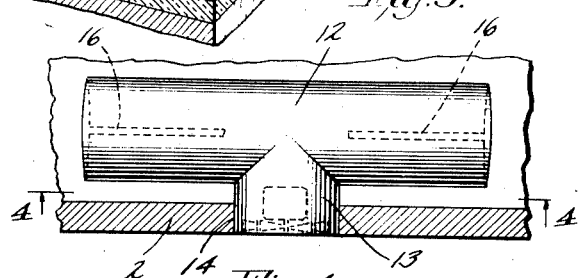
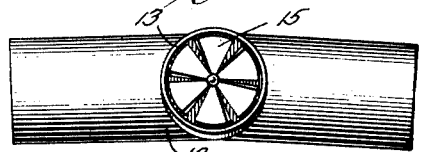
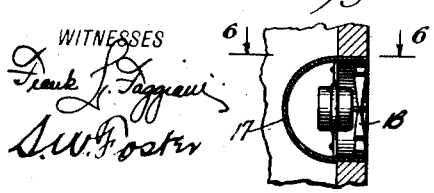
WITNESSES
INVENTOR
H. C. PIERCE,
BY
ATTORNEYS

UNITED STATES PATENT OFFICE.

HOWARD CASTNER PIERCE, OF HARRODSBURG, KENTUCKY.

REFRIGERATOR.

1,396,875.    Specification of Letters Patent.    Patented Nov. 15, 1921.

Application filed March 27, 1920. Serial No. 369,407.

*To all whom it may concern:*

Be it known that I, HOWARD C. PIERCE, a citizen of the United States, and a resident of the city of Harrodsburg, in the county of Mercer and State of Kentucky, have invented a new and Improved Refrigerator, of which the following is a full, clear, and exact description.

This invention relates to improvements in refrigerators, an object of the invention being to provide improved means whereby a circulation of air is induced through an ice or other refrigerant chamber, and then through a cooling chamber where poultry, meats, eggs, fruits, vegetables, etc., are stored.

A further object is to provide a refrigerator having improved means for controlling and directing the flow of air, so as to carry off offensive odors as well as maintain the desired low temperature in the cooling chamber.

With these and other objects in view, the invention consists in certain novel features of construction, and combinations and arrangements of parts as will be more fully hereinafter described and pointed out in the claims.

In the accompanying drawings:

Figure 1 is a sectional perspective view illustrating my invention.

Fig. 2 is a fragmentary sectional view showing one end of the air outlet flue.

Fig. 3 is a view in section on the line 3—3 of Fig. 2.

Fig. 4 is a front elevation of the air flue and fan.

Fig. 5 is a view in vertical section illustrating a modification.

Fig. 6 is a view in section on line 6—6 of Fig. 5.

1 represents a casing having insulated walls, and this casing may constitute a portion of a building, or be an entirely separate structure, of the size and shape desired.

The casing 1 is divided by a vertical partition 2 into a comparatively small refrigerant chamber 3, and a relatively large cooling chamber 4.

A horizontal, perforated, ice-supporting platform 5 is provided in chamber 3 spaced above the bottom 6 constituting a drip pan or platform, and a trap door 7 is provided in the casing top to admit the ice 8 to the chamber 3.

It is of course understood that the chamber 3 can be constructed in various ways to provide ample accommodation for the ice, and I may of course employ any refrigerating medium desired to reduce the temperature in chamber 3.

Hinged shutters 9 are provided at the top of the partition 2 and hinged shutters 10 are provided at the bottom of partition 2 controlling communication between the chambers 3 and 4, and a trap door 11 is provided in the top of chamber 4.

An air flue 12 is located in the chamber 3 below the platform 5 and has a central outlet pipe 13 secured in an opening 14 in the partition 2. A fan or blower 15 is mounted in the pipe 13 and forces the air into chamber 4.

The ends of the flue 12 at opposite sides of pipe 13 incline or slope downwardly to their outer ends, and have longitudinal slots 16 in their lower portions to permit moisture, which may collect in the flue, to escape through said slots onto the drip platform 6. The inclination of the flue also tends to prevent moisture from reaching the fan.

In Figs. 5 and 6 I illustrate a modification in which a curved shield 17 is employed to protect the fan 18 from drip water but permit a free flow of air through the open ends of the shield.

While of course my improved refrigerator is capable of varying operation to suit conditions I give below the preferred arrangement of parts under ordinary conditions.

In hot weather the trap doors 9 are opened and trap doors 10 closed. Air is drawn downwardly through the chamber 2 and discharged by the fan 15 into the lower portion of chamber 4.

The air in its passage upwardly through chamber 4 not only takes up the heat of the articles in chamber 4, but also carries with it the odors, and enters the upper portion of chamber 3 and is drawn downwardly through the ice or other refrigerant means. In its passage through chamber 3 the air is cooled, dehumidified and cleansed, and is returned to chamber 4 as before.

In cold weather when the temperature of the outside atmosphere is lower than the desired temperature in chamber 4, all of the shutters 9 and 10 are closed, and trap doors 7 and 11 are opened. Air from the outside is then drawn through the trap 7, chamber 3, flue 12 and pipe 13 into chamber 4 and escapes through the trap 11.

When slow cooling or holding goods chilled is desired, the fan is stopped and shutters 9 and 10 opened, which causes a slow circulation through the chambers 3 and 4.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:

1. A refrigerator comprising a casing, having a refrigerant and a cooling chamber, a flue in the refrigerant chamber having a central outlet communicating with the cooling chamber, a fan in said outlet, said flue having its ends inclining downwardly from said outlet and having longitudinal slots in the lower portion of its ends.

2. A refrigerator building, comprising a room, a vertical partition spaced from one wall of the room and dividing the room into a refrigerant chamber, a cooling chamber, a horizontal ice platform in the refrigerant chamber spaced above the bottom thereof, said wall having shutters at its upper and lower ends controlling communication between the cooling chamber and the refrigerant chamber, and a flue extending longitudinally of the refrigerant chamber below the ice platform and having a central inlet communicating with the cooling chamber, a blower in said inlet, said flue having both of its ends inclined downwardly from its intermediate portion whereby drip from the ice cannot enter the flue.

HOWARD CASTNER PIERCE.